(12) United States Patent
Grolnic et al.

(10) Patent No.: US 7,294,940 B2
(45) Date of Patent: Nov. 13, 2007

(54) POWER OVER ETHERNET BATTERY BACKUP

(75) Inventors: Martin Grolnic, Potomac, MD (US); William J. Kautter, Raleigh, NC (US)

(73) Assignee: System Engineering International, Frederick, MD (US)

( * ) Notice: Subject to any disclaimer, the term of this patent is extended or adjusted under 35 U.S.C. 154(b) by 0 days.

(21) Appl. No.: 11/344,175

(22) Filed: Feb. 1, 2006

(65) Prior Publication Data

US 2006/0186739 A1    Aug. 24, 2006

Related U.S. Application Data

(60) Provisional application No. 60/648,412, filed on Feb. 1, 2005.

(51) Int. Cl.
*H02J 7/34* (2006.01)
*H02J 9/00* (2006.01)

(52) U.S. Cl. ............................ 307/66; 307/86; 307/22
(58) Field of Classification Search .................. 307/22, 307/23, 46, 86, 66; 320/112
See application file for complete search history.

(56) References Cited

U.S. PATENT DOCUMENTS

| | | | |
|---|---|---|---|
| 5,990,577 A * | 11/1999 | Kamioka et al. ............. 307/46 |
| 6,643,566 B1 * | 11/2003 | Lehr et al. .................. 700/286 |
| 6,795,322 B2 * | 9/2004 | Aihara et al. ................. 363/37 |
| 7,081,827 B2 * | 7/2006 | Addy ........................... 307/38 |
| 7,159,129 B2 * | 1/2007 | Pincu et al. ................. 713/300 |
| 2003/0063509 A1 | 4/2003 | Yamasaki |
| 2004/0268160 A1 | 12/2004 | Atkinson et al. |
| 2005/0245127 A1 | 11/2005 | Nordin et al. |
| 2006/0050465 A1 * | 3/2006 | Cho et al. .................... 361/118 |
| 2006/0063509 A1 * | 3/2006 | Pincu et al. ................. 455/402 |

\* cited by examiner

*Primary Examiner*—Michael Sherry
*Assistant Examiner*—Andrew M. Deschere
(74) *Attorney, Agent, or Firm*—Oblon, Spivak, McClelland, Maier & Neustadt, P.C.

(57) ABSTRACT

An apparatus, system, and method for providing DC battery backup power to Power over Ethernet, (PoE) Mid Span or End Point Power Sourcing Equipment, (PSE), such that in the event of the loss of utility power the PSE device is able to continue to provide power for some time while battery capacity remains. The apparatus includes an AC to DC converter that receives an AC power input and outputs DC power to the power over Ethernet circuitry and a DC battery pack that provides backup DC power to the power over Ethernet circuitry.

6 Claims, 8 Drawing Sheets

Figure 1

Background Art

Standard Configuration of Mid-Span Power Hub with AC Input/Output UPS Backup

Background Art

PoE DC UPS as embodied by a DC powered mid-span power hub with an external DC UPS

Figure 3b

PoE DC UPS as embodied by a mid-span power hub with integrated battery pack

Figure 5

Power Conversion Block Diagram AC UPS versus DC UPS during Normal Operation (AC powered)

Figure 6

Power Conversion Block Diagram AC UPS versus DC UPS during Backup Power Operation

POWER OVER ETHERNET BATTERY BACKUP

CROSS-REFERENCE TO RELATED APPLICATIONS

This application is based upon and claims the benefit of priority from the prior U.S. Provisional Application No. 60/648,412, filed Feb. 1, 2005, the entire contents of which are incorporated herein by reference.

BACKGROUND OF THE INVENTION

1. Field of Invention

A method, system, device, and computer program product for providing backup battery power to an Ethernet power distribution system.

2. Discussion of the Background

The IEEE 802.3af standard (the 802.3af standard), the entire contents of which are incorporated herein by reference, was approved on Jun. 12, 2003 by the Institute of Electrical and Electronic Engineers (IEEE). The 802.3af standard defines the specifications to deliver power over standard Ethernet cables. The following issues are addressed by the standard:

Legacy Installation—Power over Ethernet ensures safe delivery of power to existing legacy devices as well as power-enabled terminals.

Preservation of Cabling Infrastructure—PoE avoids altering existing wiring and does not damage cabling infrastructure already in place.

Data Integrity—Power delivery over Ethernet cables does not cause data degradation or loss of data integrity.

When the Ethernet was created, the equipment to be linked drew 50 to a few hundred watts, far too much power to think of sending over data lines. But in the past few years, more and more nontraditional devices have been showing up on networks that require much less power—principally wireless LAN access points and Internet protocol (IP) telephones. One of the main benefits of the new 802.3af standard permitting a networked device's power supply to be carried over its data lines is that now organizations installing or extending an Ethernet LAN can do so without the expense of calling in an electrician and running 120-V AC lines.

The 802.3af standard defines two types of basic devices: a powered device (PD), like an IP phone, and power sourcing equipment (PSE), like a Mid-span Power Hub or Powered Ethernet Switch.

According to the standard, the PSE constantly probes the network with a very-low-voltage and -current signal, and when it detects a valid signature (called a PD detection signature), the PSE applies power to the PD via the network. The power supplied is 48 Vdc nominal, 15.4 W max at the output port, over unshielded twisted-pair wiring. It works with existing cable plant, including Category 3, 5, 5e or 6; horizontal and patch cables; patch-panels; outlets; and connecting hardware, without requiring modification.

The current delivered to each node is limited to 350 milliamps. The total amount of continuous power that can be delivered to each node, taking into account some power loss over the cable run, is 12.95 watts. IP phones and wireless LAN access points typically consume 3.5 to 10 watts.

Additionally, the IEEE is currently working to extend the scope of power over Ethernet by increasing the amount of power that can be delivered via the network. This effort is commonly referred to as PoE Plus.

Power is carried on two wire pairs, to comply with safety standards and existing cable limitations. The 802.3af standard power sourcing equipment contains a detection mechanism to prevent sending power to noncompliant devices. Only terminals that present a valid Power over Ethernet signature will receive power, preventing damage to other equipment.

The 802.3af standard defines two types of power sourcing equipment: endpoint and mid-span. Endpoint refers to an Ethernet switch with embedded Power over Ethernet technology. These new switches deliver data and power over the same wiring pairs—transmission pairs 1/2 and 3/6 or data over the standard transmission pairs and power over the spare pair. Mid-span devices resemble patch panels and typically have between six and 24 channels. They are placed between legacy switches and the powered devices. Each of the mid-span's ports has an RJ-45 data input connector and a data/power RJ-45 output connector. Mid-span devices utilize the unused wire pairs 4/5 and 7/8 to carry power, while data runs on the other wire pairs.

Traditionally, network devices, such as IP phones, wireless LAN access points, laptop computers and Web cameras, have required both a network connection and an AC power connection. Given the increasing number of LAN devices in office environments, wiring AC connections for each of them is a costly task. The 802.3af standard eliminates the need for additional AC outlets and the labor cost incurred from contracting electricians to install them.

Additionally, the technology supports a point-to-multipoint power distribution architecture, parallel to the data network. This allows implementers to use a single UPS at the network core to back up multiple scattered devices on the LAN. The 802.3af standard also provides remote access and management via SNMP or Web-based control.

Power over Ethernet is already widely adopted in the market, particularly in the VoIP, wireless LAN and IP Security market where it saves up to 50% of the overall installation costs by eliminating the need to install separate electrical wiring and power outlets. Its other major advantage, particularly for IP telephony and surveillance camera users, is the ability to offer continuous operation even in the event of a power failure by delivering centralized (distributed) battery-backed-up uninterrupted power through a UPS via the local area network (LAN).

In legacy network installations, where the Ethernet switch already exists, where a PoE PSE is being added, the AC input/output UPS is sized to provide backup power for only the Ethernet switch. A typical 24 port Ethernet switch requires only 40 watts of power. A UPS to provide 15-30 minutes of backup power to an Ethernet switch requiring 40 watts of power costs approximately $50.00 to $100.00. The addition of a PoE PSE will require a much larger and more costly UPS. A fully loaded 24 port PSE requires approximately 380 watts of power. A UPS that can provide power to both the PSE and the Ethernet switch, rated at 420 watts for 30 minutes, would cost approximately $500 to $700. Additionally, the backup time requirements for a PoE network-based security system could be even greater because PoE networks are used extensively to provide telephony and security functions.

Figure 1:
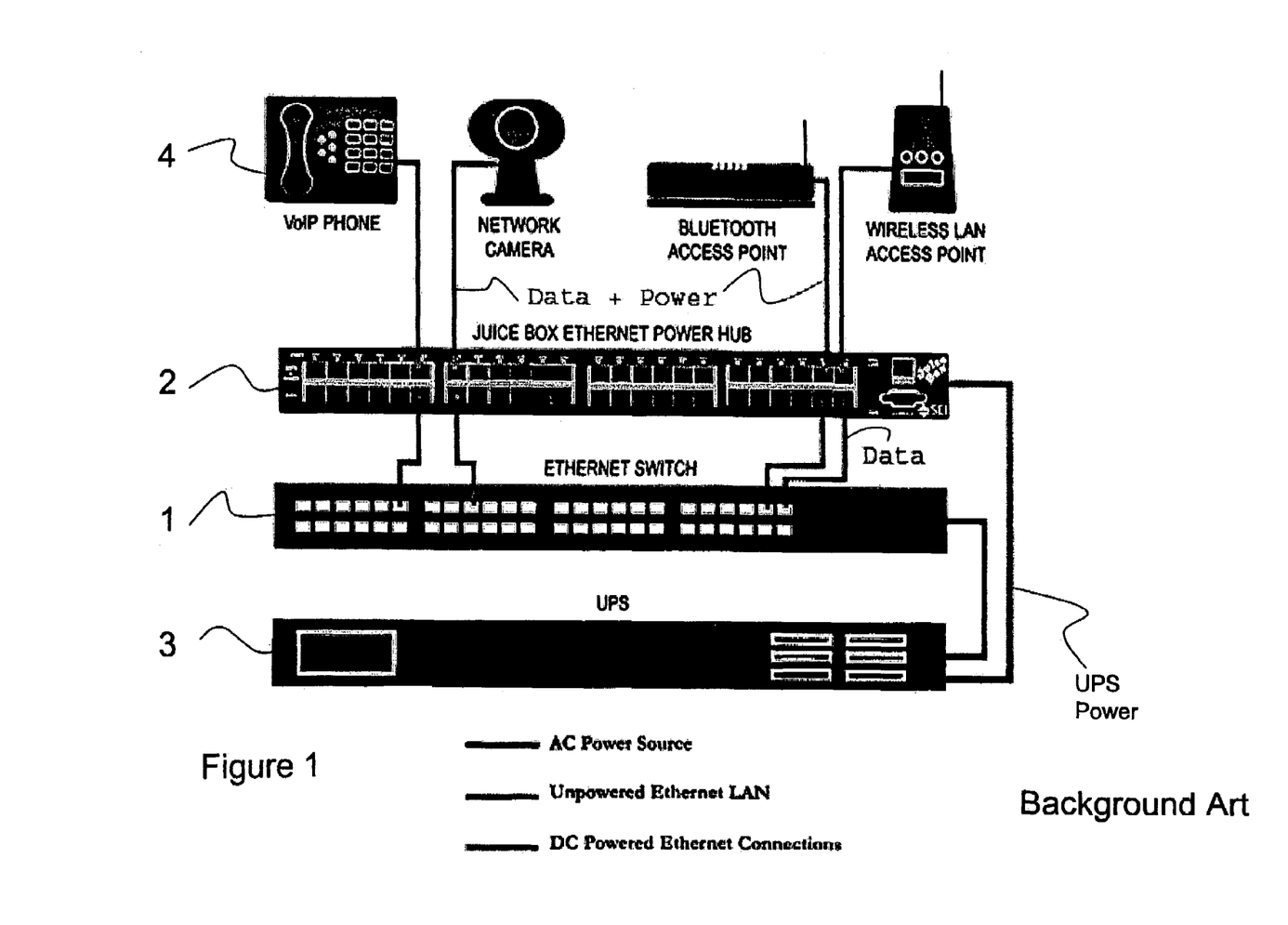
FIG. 1 is a block diagram of a conventional Power over Ethernet (POE) environment.

FIG. 1 is an example of a conventional Power over Ethernet (POE) infrastructure. In a conventional system, an Ethernet switch 1 supplies data to an Ethernet power hub 2. In addition, an uninterruptible power supply (UPS) 3 provides AC power to both the Ethernet switch 1 and the Ethernet power hub 2. Data and power is provided by the Ethernet power hub 2 to various devices such as a VoIP phone 4, network camera, blue tooth access point, and wireless LAN access point.

Figure 2:
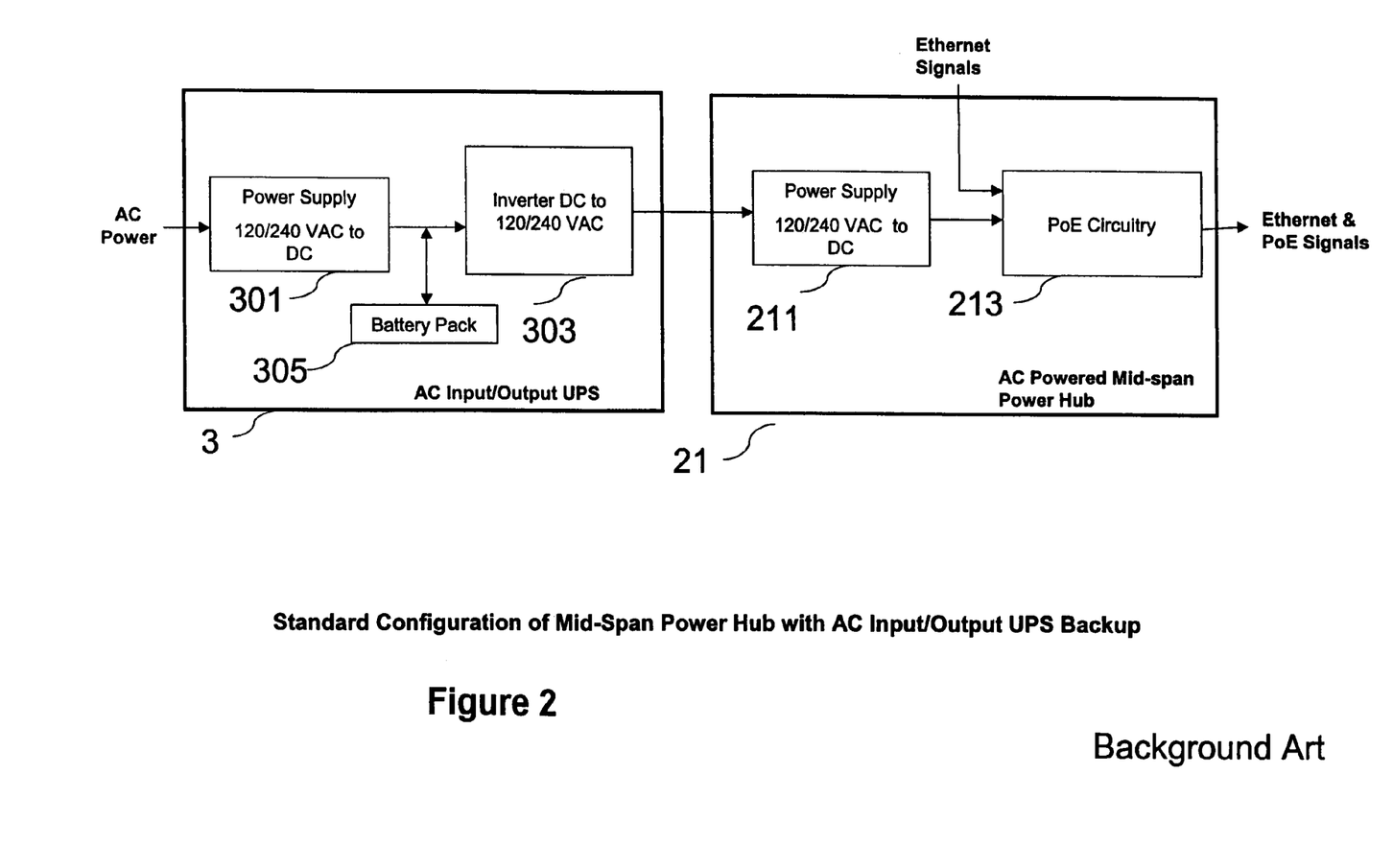
FIG. 2 is a block diagram showing a conventional Power over Ethernet (POE) mid-span device with a conventional AC UPS.

FIG. 2 provides more detail on the background art, a double conversion AC UPS, which is a standard configuration for professional grade network applications. Here, the UPS 3 includes a power supply 301 that receives AC input power and converts this AC input power to DC power. This DC power charges the internal backup battery pack 305. The DC power is provided to a DC to AC inverter 303 to convert the power back to AC. The AC power provided by the DC to AC inverter 303 is then provided to a power supply 211 within a Power over Ethernet (POE) mid-span hub 21. This AC power is then converted in the AC to DC converter 211, with DC power provided to the Power over Ethernet (POE) circuitry 213. The Power over Ethernet (POE) circuitry 213 also receives Ethernet signals for distribution. The Ethernet signals and the power provided by the AC to DC converter 211 are provided to various devices via the Power over Ethernet (POE) circuitry 213.

As noted above, in a double-conversion conventional AC UPS system there are three power conversions. This is a significantly inefficient system because there is power loss with each power conversion. This results in a considerably reduction in the length of time the AC UPS can provide backup power. Moreover, each power conversion requires a significant amount of complex electronic circuitry. Thus, with each required power conversion, there is a significant increase in cost and decrease in reliability.

The above discussion describes one configuration for an AC UPS, there are additional configurations but they all suffer from the same deficiencies.

What is desired, as recognized by the inventors, is a more efficient, lower cost method of providing backup power in a Power over Ethernet (POE) environment.

The "background" description provided herein is for the purpose of generally presenting the context of the invention. Work of the presently named inventors, to the extent it is described in this background section, as well as aspects of the description which may not otherwise qualify as prior art at the time of filing, are neither expressly or impliedly admitted as prior art against the present invention.

SUMMARY OF THE INVENTION

An apparatus, method, and system for providing uninterrupted DC power to power over Ethernet circuitry in a power sourcing device, the apparatus including a DC power output port, an AC to DC converter connected to the DC power output port and configured to receive an AC power input and output DC power to the power over Ethernet circuitry, and a DC battery pack connected to the DC power output port and configured to provide backup DC power to the power over Ethernet circuitry.

In one embodiment, battery backup DC power is provided to the PSE(s) via an external DC Uninterruptible Power Supply (DC UPS) rather than providing backup power via an AC input/AC output Uninterruptible Power Supply, (AC UPS).

In another embodiment, an AC powered PSE contains an integral backup battery pack. Connecting the AC to DC power supply of the PSE to the battery pack forms an internal DC UPS.

In another embodiment, an AC powered PSE can provide a connection to an external backup battery pack(s). Connecting the AC to DC power supply inside the PSE to the external battery pack forms a DC UPS.

In any of the above embodiments, the backup battery pack may be connected to a contact between the AC to DC converter and the PoE circuitry. In a further embodiment, a Low Voltage Disconnect (LVD) may be placed between the backup battery pack and the PoE circuitry. In another further embodiment, a web interface and SNMP agent is included to monitor and control components of the DC UPS and PoE circuitry.

It is to be understood that both the foregoing general description of the invention and the following detailed description are exemplary, but are not restrictive, of the invention.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 3A:
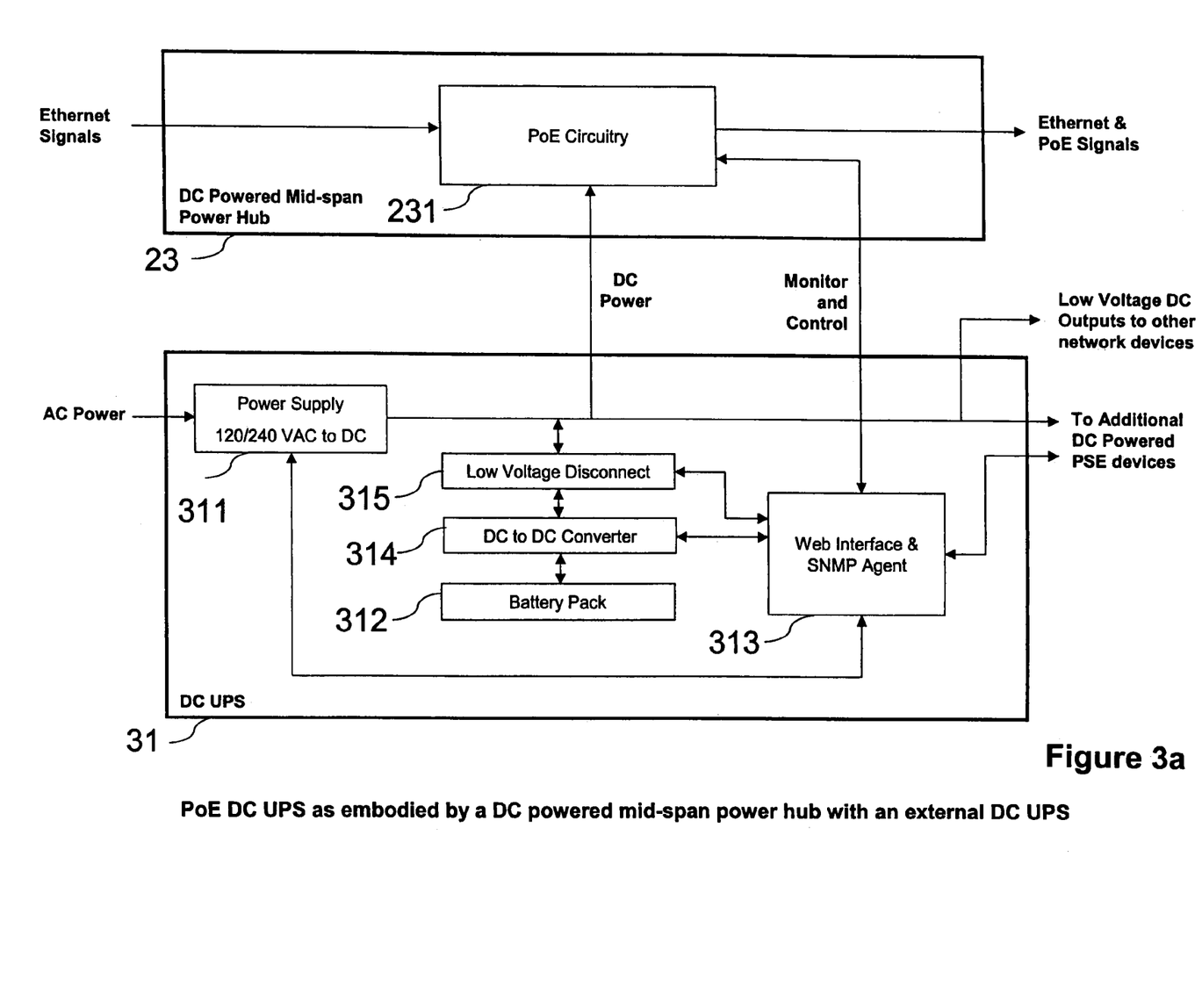
FIG. 3a is a block diagram of a Power over Ethernet (POE) mid-span device according to one embodiment of the invention.

FIG. 3a is a block diagram of one embodiment of the present invention. Here the mid-span power hub 23 is modified to accept DC power. A DC UPS 31 provides battery backed DC power to the midspan power hub 23 that contains PoE circuitry 231. The DC UPS consists of a AC to DC converter 311 and a battery pack 312. The DC battery pack 312 may be directly connected to a contact between the AC to DC power supply 311 and the DC powered mid-span power hub 23. Additionally, the DC UPS 31 may provide low voltage DC outputs to power other DC input network devices such as non-PoE enabled switches and firewalls.

In a further embodiment, the battery pack 312 is connected to the DC powered mid-span power hub 23 via a low voltage disconnect (LVD) 315. The LVD 315 disconnects the battery from the load when the battery voltage reaches a specified level, below which continued discharge could damage the battery and/or shorten battery life.

In another embodiment, the battery voltage is post-regulated to a constant DC voltage by a DC to DC converter 314. This allows the DC UPS 31 to provide a constant DC voltage while operating on battery power to the DC powered midspan power hub 23, which allows the power hub to provide PoE voltage within the levels specified by the 802.3af standard throughout the full discharge range of the battery pack 312. Optionally, this post-regulation block can be integrated into the mid-span power hub 23 instead of the DC UPS 31.

Figure 3B:
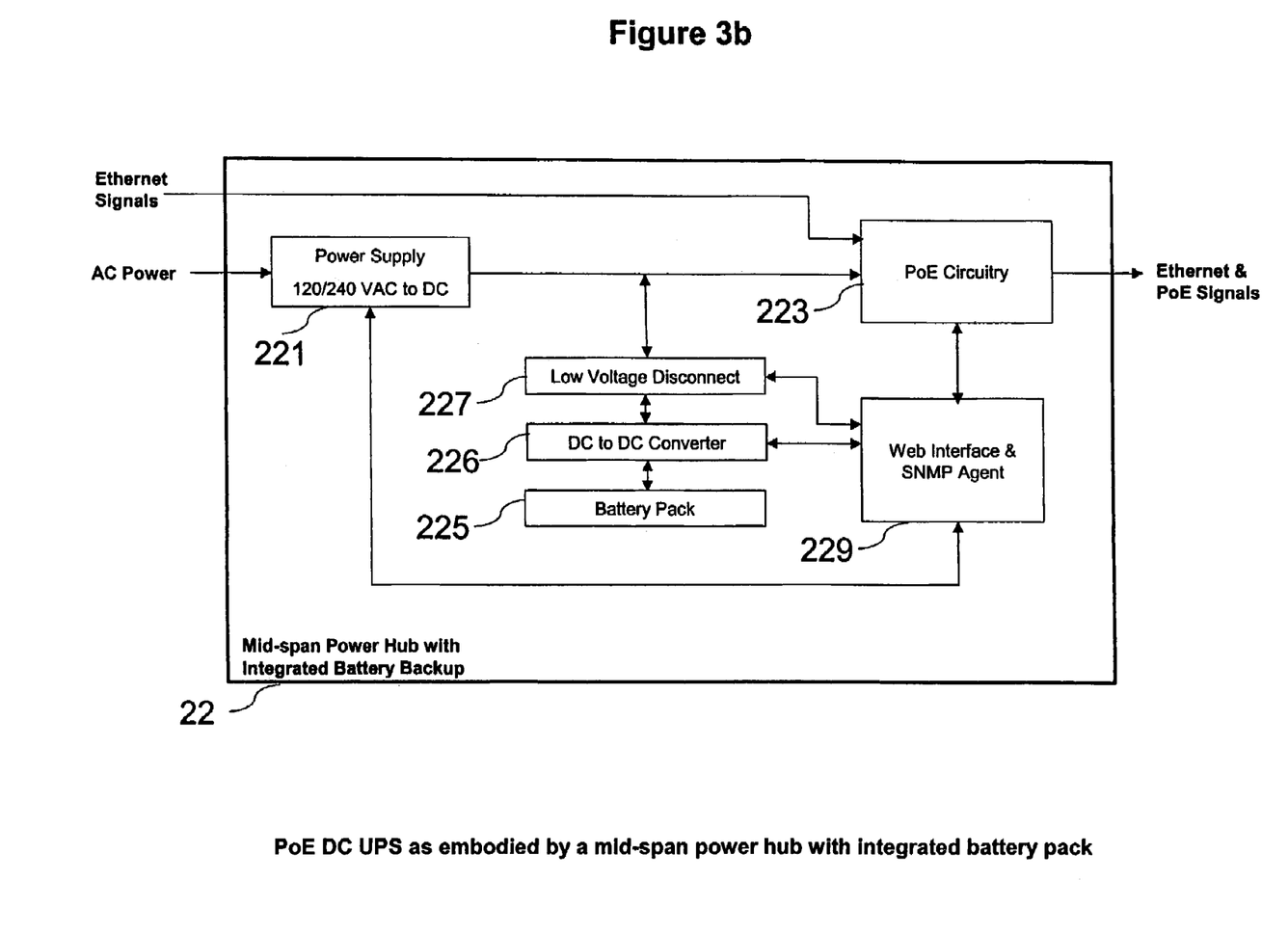
FIG. 3b is a block diagram of a Power over Ethernet (POE) mid-span device according to another embodiment of the invention.

In yet another embodiment a web interface and SNMP agent 313 is provided. The web interface and SNMP agent 313 monitors components of the DC UPS 31 and the DC powered mid-span Ethernet power hub 23 and provides control signals to these components The system parameters monitored and controlled by the web interface and SNMP agent 313, as defined by the 802.3af standard, include the following:

System Power Source (AC vs Battery)
   System DC Output Voltage
   System Power Delivered
   System Power Allocated
   Mid-Span Hub Internal Temperature
   UPS Internal Temperature
   Battery Charge Status
   Battery Capacity Remaining
   Mid-Span Hub Name The individual PoE port parameters monitored and controlled by the web interface and SNMP agent 313, as defined by the 802.3af standard, include the following:

Port Status
   Port Power Output
   Port Current Output
   Port Classification
   Maximum Port Output Power
   Detection Method
   Port Name
   Port Priority Level FIG. 3b is a block diagram of another embodiment of the present invention. Here the mid-span power hub 22 is modified to include an internal battery pack 225. The battery pack 225 may be directly connected to a contact between the AC to DC power supply 221 and the Power over Ethernet (POE) circuitry 223. The battery pack 225 working with the AC to DC converter 221 forms a DC UPS.

As above, further embodiments include a low voltage disconnect 227, battery post-regulation via a DC to DC converter 226, and a web interface and SNMP agent 229.

Figure 3C:
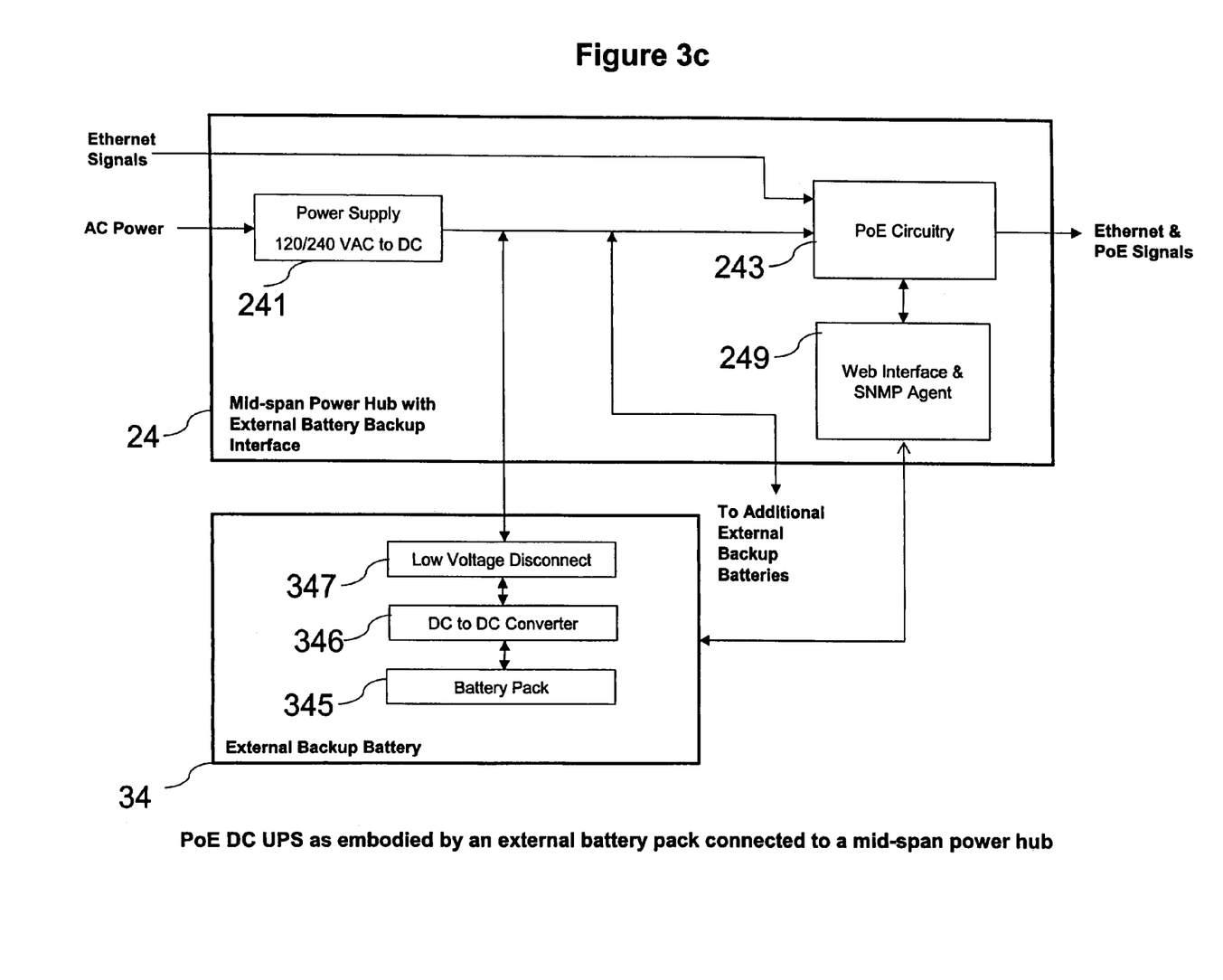
FIG. 3c is a block diagram of a Power over Ethernet (POE) mid-span device according to another embodiment of the invention.

FIG. 3c is a block diagram of another embodiment of the present invention. Here the mid-span power hub 24 is modified to include an interface to one or more external backup battery packs 34. The AC to DC converter 241 inside the mid-span power hub 24 provides the charge voltage for the external backup battery pack 32. The external backup battery pack(s) 34 working with the internal AC to DC converter 241 forms a DC UPS.

As above, further embodiments include a low voltage disconnect 347 and battery post-regulation via a DC to DC converter 346 and a web interface and SNMP agent 249.

Figure 4:
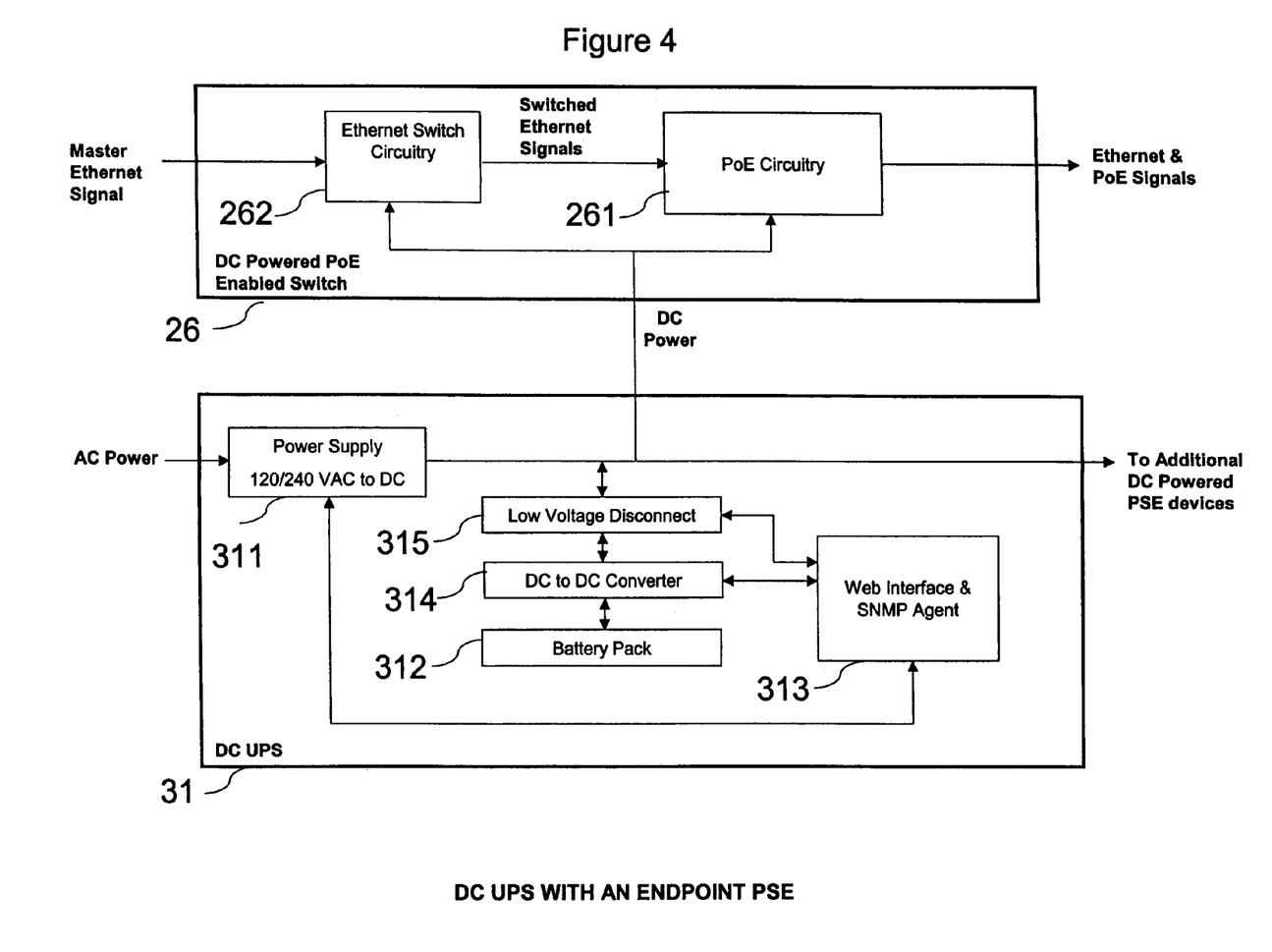
FIG. 4 is a block diagram of a Power over Ethernet (POE) endpoint device according to one embodiment of the invention.

FIG. 4 is a block diagram of another embodiment of the present invention, as applied to an endpoint Power over Ethernet (POE) device, otherwise known as a Power over Ethernet (POE) enabled Ethernet switch. Here a Power over Ethernet (POE) enabled Ethernet switch 26 is modified to accept DC Power. The Power over Ethernet (POE) enabled Ethernet switch 26 includes Ethernet switch circuitry 262 and Power over Ethernet (POE) circuitry 261. The Power over Ethernet (POE) enabled Ethernet switch 26 is powered by a DC UPS 31 as described above.

In other embodiments of the invention, the POE enabled Ethernet Switch is modified to include an internal battery pack or to interface to an external battery pack, in the same manner as the mid-span power hub described above.

Figure 5:
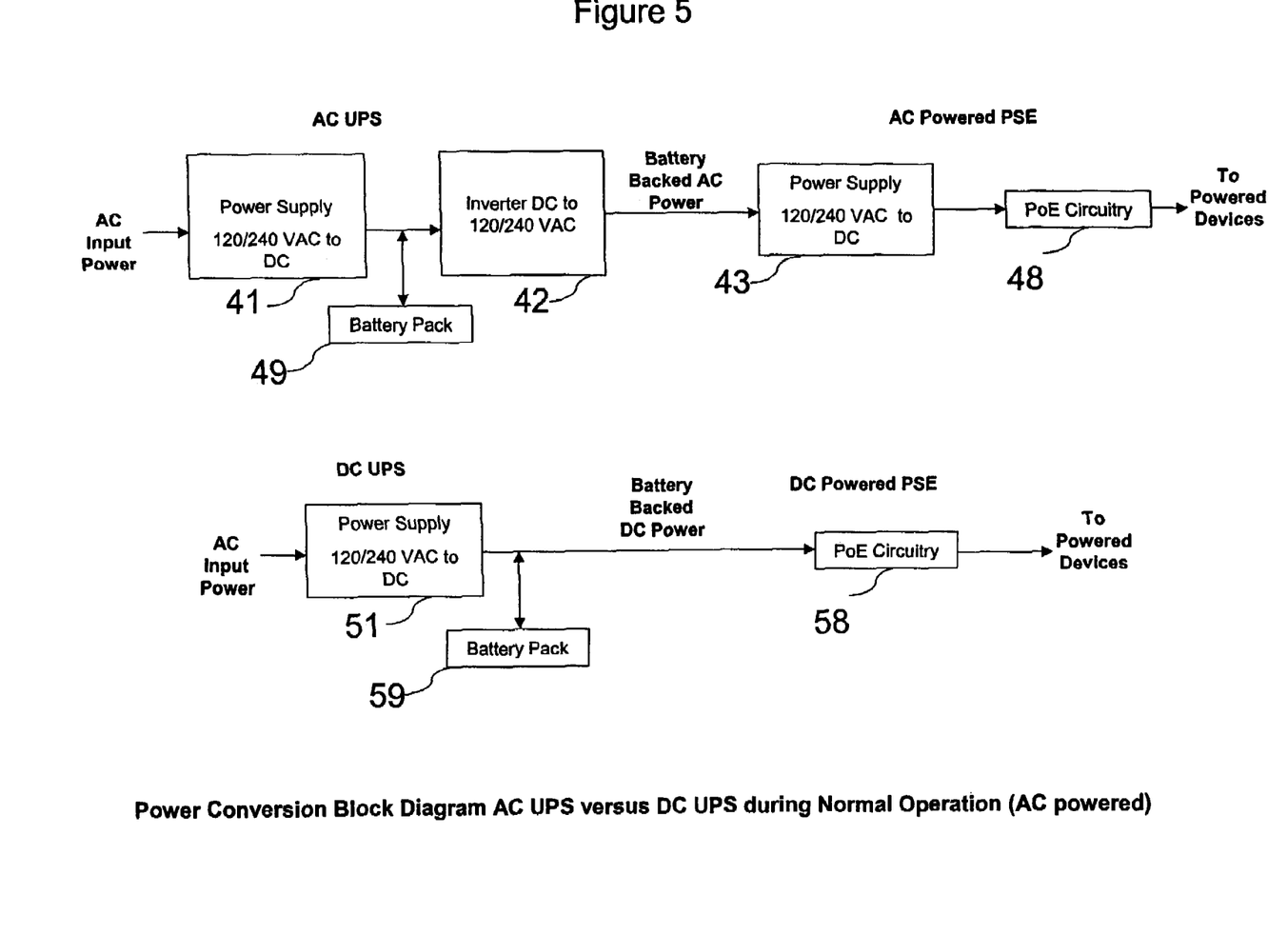
FIG. 5 is a block diagram comparison of an AC UPS vs DC UPS in a Power over Ethernet (POE) environment when operating under normal conditions.

A DC UPS backup system is inherently more efficient and cost effective than an AC UPS backup system as will be discussed in the following. FIG. 5 is a simplified block diagram which compares a DC UPS system to an AC UPS system when operating under normal conditions (i.e. AC input power). In a DC UPS system there is an AC input power supply (rectifier) 51 that converts the AC power to DC, charges the batteries 59, and supplies power to the load. The load, meaning the PSE 58 and the PoE powered devices, is always connected directly to the batteries 59. Thus, there is only one power conversion, that of the input AC voltage to the DC voltage required to charge the batteries and power the load. Another advantage of a DC-UPS is that there is zero switch-over-time. Because the load is always across the battery, there is no delay in providing backup power when AC power is lost.

As noted above, in a double-conversion professional grade AC UPS system there are three power conversions. The first power conversion is the AC to DC power supply 41 that converts AC input voltage to DC battery charging voltage. The second power conversion is the DC to AC inverter 42 that converts the DC battery charging voltage back to AC. The third power conversion occurs inside the AC powered PSE (mid-span power hub or PoE enable Ethernet switch). Power Supply 43 converts the battery backed AC power from the AC UPS to DC and supplies it to the PoE circuitry 48 which distributes the DC power to the powered devices.

Each power conversion in the conventional device requires a significant amount of complex electronic circuitry. The AC UPS system requires three power conversions while the DC UPS system only requires one. Therefore, in a first order analysis, the DC UPS system of the present invention will have three times the reliability of the AC UPS system.

Figure 6:
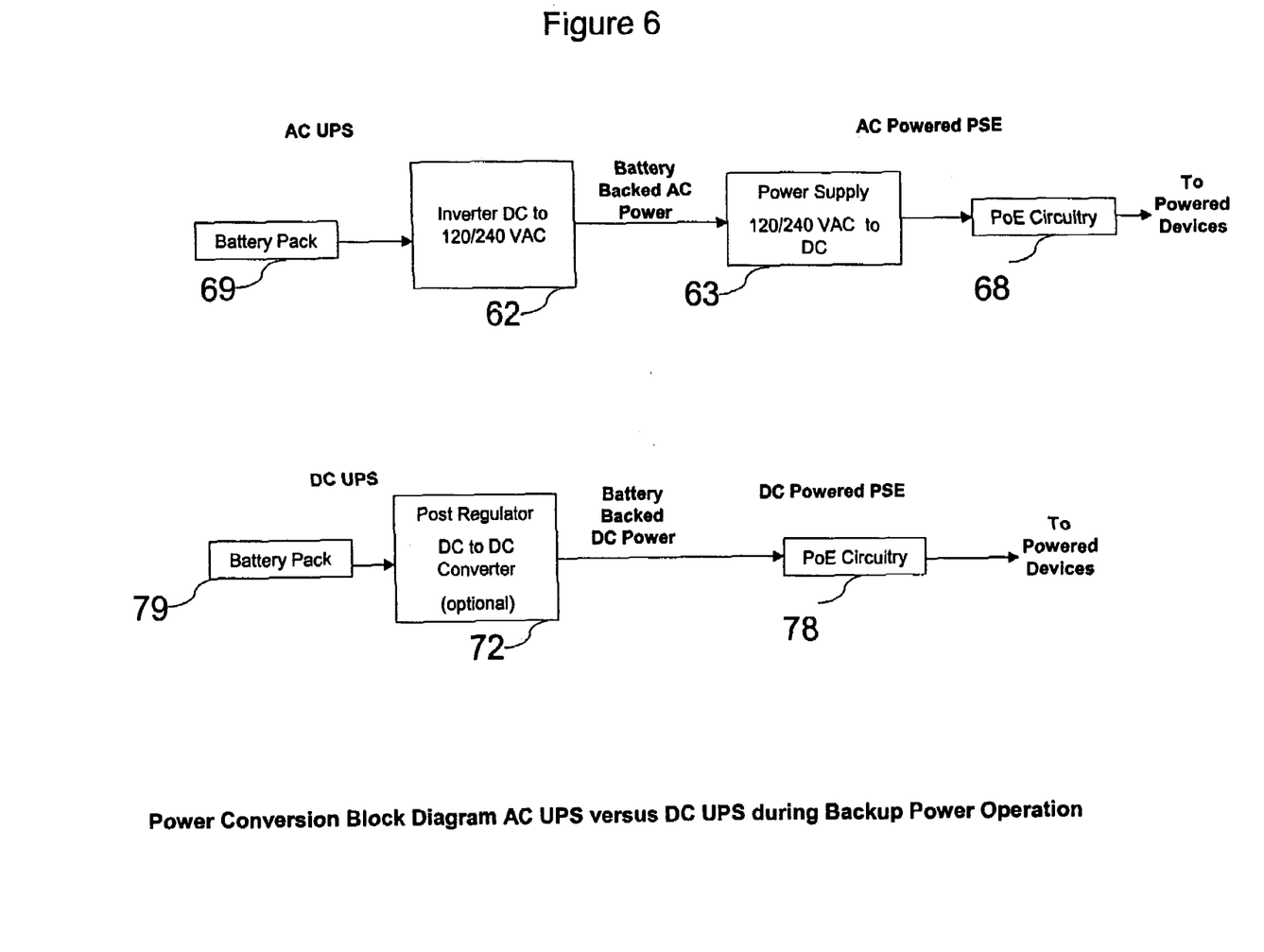
FIG. 6 is a block diagram comparison of an AC UPS vs DC UPS in a Power over Ethernet (POE) environment when operating under backup power conditions.

The present invention, whether embodied by powering a DC input power PSE with an external DC UPS or integrating a backup battery pack into a PSE, is significantly more efficient than an AC UPS when operating off of battery power. FIG. 6 is a simplified block diagram which compares a DC UPS system to an AC UPS system when operating under backup power conditions. In a DC UPS there are no power conversions when operating in backup power mode. The backup battery pack 79 is connected directly to the load 78 (the PSE device and the powered devices). Even if optional battery post-regulation 72 is included, only one conversion is required (and this conversion takes the form of a very high efficiency, DC to DC boost converter). In an AC UPS there are two power conversions when operating off of battery power. The AC UPS converts the DC Power from the backup battery pack 69 to AC power via the DC to AC inverter 62. This AC power is then converter back to DC via the AC to DC power supply 63 internal to the AC powered PSE device. Each power conversion consumes energy due to less than perfect efficiency. To get the same amount of back up time the AC UPS will require more battery capacity than a DCU PS. More battery capacity means more battery weight and size. Since batteries account for most of the weight and space requirements of a UPS system, a DC UPS will weigh less and take less space than an AC UPS for a similar amount of output power and backup time. This weight difference alone can amount to hundreds of pounds for systems in the 1000 to 5000 watt range.

The combination of increased complexity due to additional power conversions and more battery capacity needed to overcome reduced efficiency results in a significant increase in the cost for an AC UPS versus a DC UPS. Analysis of list prices for AC UPS in the 1000 to 4000 watt range providing 2 hours of backup power show that an AC UPS system costs from 50% to 150% more than a DC UPS system for comparable power output and backup time.

An example of this cost savings shows that at
1000 watts of Output Power a DC UPS can be 58% less expensive,
2000 watts of Output Power a DC UPS can be 50% less expensive,
3000 watts of Output Power a DC UPS can be 43% less expensive,
4000 watts of Output Power a DC UPS can be 36% less expensive.

In summary, the backup power requirements of a Power over Ethernet network are significantly greater than what is required for a data-only network. In a data-only network architecture, the backup power requirements are fairly modest. The low power levels (40 W per 24 network ports) and short backup time requirements (typically 15-30 minutes) can effectively be provided by a standard AC UPS. With the advent of Power over Ethernet, the backup power requirements of a network have changed dramatically. The output power level for even a small PoE network will be around 250 W. A large PoE network can have output power requirements in the 2-5 kW range. Also, because PoE networks are used extensively to provide telephony and security functions, the required duration of operation on backup power has increased substantially. Typical telephony backup time ranges from 2 to 8 hours. The backup time requirements for a PoE network-based security system could be even greater.

Thus, the advantages of using a DC UPS (internal or external) to provide backup power for a Power over Ethernet system are:
Lower cost
Higher reliability
Smaller foot print
Less weight The previous discussion addresses the IEEE 802.3af standard. However, as understood by one skilled in the art, the previously described systems and method are applicable to future standards and procedures for Power over Ethernet.

Thus, the foregoing discussion discloses and describes merely exemplary embodiment of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. An apparatus for providing distributed uninterrupted DC power supply to an Ethernet power distribution system incorporating one or more power over Ethernet power sourcing devices, the apparatus comprising:
a DC power output port;
an AC to DC converter connected to the DC power output port and configured to receive an AC power input and output DC power to the DC power output port;
a 48V rechargeable battery pack configured to provide backup DC power to the DC power output port;
a DC to DC converter connected to the rechargeable battery pack and configured to regulate a voltage from the rechargeable battery pack to a constant DC voltage;
a low voltage disconnect unit connecting the DC to DC converter to the DC power output port, the low voltage disconnect unit is configured to disconnect the battery when the battery voltage reaches a specified level; and
a network interface connected to the AC to DC converter, the low voltage disconnect unit, the DC to DC converter, and the power over Ethernet circuitry and configured to monitor and send control signals to the AC to DC converter, the low voltage disconnect unit, the DC to DC converter, and the power over Ethernet circuitry.

2. The apparatus according to claim 1, the power sourcing device comprising:
a mid-span power hub.

3. The apparatus according to claim 1, the power sourcing device comprising:
an endpoint power sourcing device.

4. The apparatus according to claim 1, wherein the rechargeable battery pack is located externally from the power sourcing device.

5. The apparatus according to claim 1, wherein the apparatus is located within the power sourcing device.

6. The apparatus according to claim 1, wherein the rechargeable battery pack is directly connected to a contact between the AC to DC converter and the DC power output port.

* * * * *